(12) United States Patent
Shrestha

(10) Patent No.: US 8,051,725 B2
(45) Date of Patent: Nov. 8, 2011

(54) METHOD AND APPARATUS FOR SOIL SAMPLING

(75) Inventor: Dev S. Shrestha, Moscow, ID (US)

(73) Assignee: University of Idaho, Moscow, ID (US)

(*) Notice: Subject to any disclaimer, the term of this patent is extended or adjusted under 35 U.S.C. 154(b) by 647 days.

(21) Appl. No.: 12/233,353

(22) Filed: Sep. 18, 2008

(65) Prior Publication Data

US 2009/0071714 A1   Mar. 19, 2009

Related U.S. Application Data

(60) Provisional application No. 60/994,395, filed on Sep. 18, 2007.

(51) Int. Cl.
   *G01N 1/20*   (2006.01)
(52) U.S. Cl. .................................................... 73/863.52
(58) Field of Classification Search ........................ None
   See application file for complete search history.

(56) References Cited

U.S. PATENT DOCUMENTS

| 4,718,289 | A | * | 1/1988 | Barrett | 73/863.57 |
| 4,869,115 | A | * | 9/1989 | Edwards et al. | 73/864.31 |
| 5,372,037 | A | * | 12/1994 | Butt | 73/152.04 |
| 2007/0256509 | A1 | * | 11/2007 | Burton | 73/864.45 |

FOREIGN PATENT DOCUMENTS

JP   11075547   *   3/1999

* cited by examiner

*Primary Examiner* — Robert Raevis
(74) *Attorney, Agent, or Firm* — Klarquist Sparkman, LLP

(57) ABSTRACT

A soil collection device can be used to collect soil samples from a harvester that excavates soil while harvesting a ground crop. The soil collection device can include a collection area for collecting soil that is excavated from the ground by the harvester and discarded from the harvester. A storage device can receive and store at least a portion of the discarded soil in individual containers. A location marking device can being configured to mark the individual containers of discarded soil with information concerning the location of the soil collection device at or about the time the discarded soil was received in the individual containers.

19 Claims, 9 Drawing Sheets

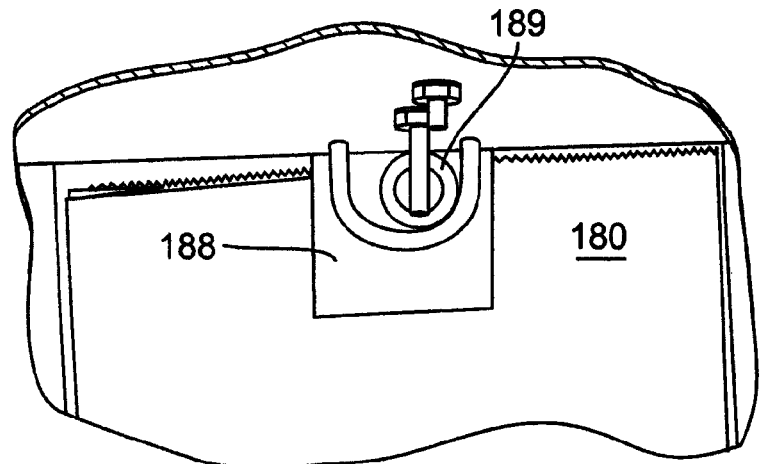
FIG. 7
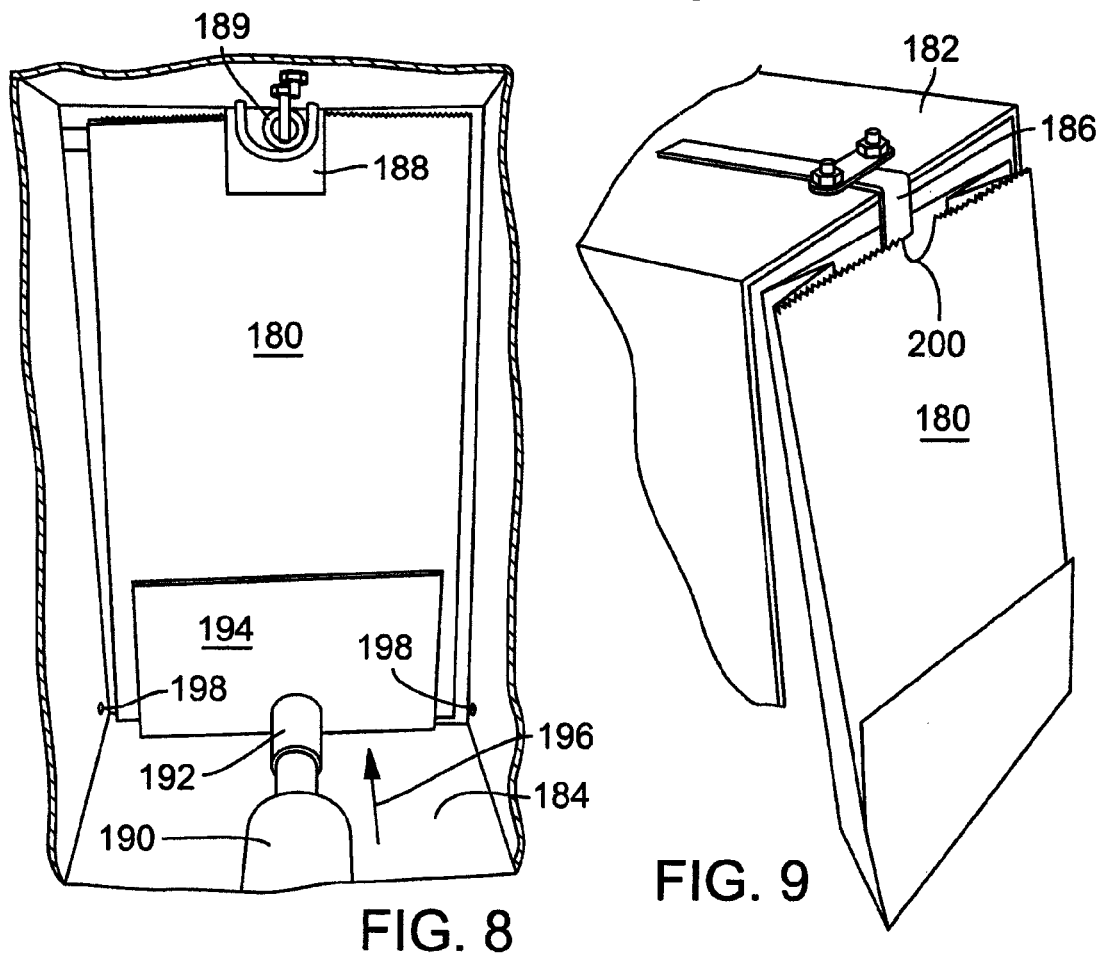
FIG. 8
FIG. 9

METHOD AND APPARATUS FOR SOIL SAMPLING

CROSS REFERENCE TO RELATED APPLICATION

This application claims the benefit of the earlier filing date of U.S. Provisional Application No. 60/994,395, filed on Sep. 18, 2007. The entire disclosure of Provisional Application No. 60/994,395 is considered to be part of the disclosure of the accompanying application and is incorporated herein by reference.

ACKNOWLEDGMENT OF GOVERNMENT SUPPORT

This invention was made with government support under Agreement No. 06-8100-1167-CA, which was awarded by the Animal and Plant Health Inspection Service (APHIS) of the United States Department of Agriculture (USDA). The government has certain rights in the invention.

FIELD

The invention relates generally to soil sampling devices and, more particularly, to methods and devices for collecting and storing excavated soil obtained from ground crop harvesters and/or other digging machinery.

BACKGROUND

Soil sampling of fields is useful for a variety of reasons. For example, soil sampling can be used to study soil changes resulting from crop growing practices and to diagnose specific crop problems. Soil sampling can also be used to assess soil fertility in order to develop a future planting or fertilization plan.

In order to achieve accurate soil sampling, it is desirable to obtain soil samples from a plurality of locations in the field that is being studied. Current soil sampling techniques, however, are labor intensive and require significant time consuming efforts to obtain samples from various representative locations in a field.

SUMMARY

In a first embodiment, an apparatus is provided for collecting soil samples while harvesting a crop from the ground. The apparatus can comprise a moveable chassis, a digging member, a conveyor member, and a soil collecting device. The digging member can be coupled to the moveable chassis and configured to enter the ground and excavate a combination of soil and crop from the ground. The conveyor member can be coupled to the moveable chassis and have a transporting surface that is configured to receive at least a portion of the excavated combination of soil and crop. At least a portion of the transporting surface can have openings that extend through the transporting surface, with the openings being sufficiently large to allow at least a portion of the excavated soil to pass through the openings. The soil collecting device can be coupled to the moveable chassis and configured to collect and store at least a portion of the excavated soil that passes through the openings on the transporting surface of the conveyor member.

In specific embodiments, the soil collecting device can further comprise a soil containing system that comprises a plurality of individual containers configured to receive the collected soil. In another specific embodiment, the soil containing system can be configured to receive the collected soil in one individual container at a time. An automated system for advancing individual containers from a first location to a second location can be provided, with the first location being a container storage area and the second location being a container filling area.

In another specific embodiment, the soil collecting device can comprise a printing device that is configured to receive geographic location identifying information and to print information representative of the geographic location indentifying information onto one or more of the individual containers. The geographic location identifying information can be sufficient to substantially identify at least the approximate location where the soil was excavated from the ground, such as by GPS.

In another specific embodiment, the individual containers can comprise sampling bags. The soil containing system can further comprise a bag opening device for opening a top portion of one sampling bag at a time. In another specific embodiment, the soil collecting device can further comprise a soil diverting device having an opening at a top surface, a soil collection channel, a soil diverting channel, and a diverter. The soil collection channel can be configured to direct excavated soil to a soil collection area, and the soil diverting channel can be configured to direct excavated soil back to the ground. The diverter can be configured to move between a first position and a second position. When the diverter is in the first position, excavated soil that enters the soil diverting device moves from the opening at the top surface of the soil diverting device into the soil collection channel. When the diverter is in the second position, excavated soil that enters the soil diverting device moves from the opening at the top surface of the soil diverting device into the soil diverting channel.

In another specific embodiment, a soil weighing mechanism is provided. The soil weighing mechanism can be configured to weigh an individual container of collected soil, and when the individual container reaches a predetermined weight, the diverter can move from the first position to the second position. In another specific embodiment, the soil collecting device can further comprise an opening at a top surface and a porous cover surrounding at least a part of the opening. The porous covering can be sized to prevent rocks or clots of a certain size from entering into the opening.

In another specific embodiment, a soil conveying device can be provided. The soil collecting device can be positioned remotely from a location where the excavated soil passes through the openings in the conveyor, and the soil conveying device can be configured to collect the excavated soil that passes through the openings in the conveyor and to move the excavated soil to the location of the soil collecting device.

In another embodiment, a soil collection device for use with a ground crop harvester is provided. The soil collection device can comprise a mounting member for mounting the soil collection device to the harvester; a collection area for collecting soil that is excavated from the ground by the harvester and discarded from the harvester; a storage device for collecting and storing at least a portion of the discarded soil in individual containers; and a location marking device. The location marking device can be configured to mark the individual containers of collected soil with geographic location information. The geographic location information can be sufficient to substantially identify at least the approximate location where the stored soil was excavated from the ground.

In a specific embodiment, the location marking device can comprises a printer that is configured to receive GPS data and to print location identifying information from the GPS data onto the individual containers. In another specific embodiment, the soil collection device can comprise an opening at a top surface of the soil collection device and a gate that is moveable from a first position to a second position. When the gate is in the first position, discarded soil can pass through the opening into the collection area, and when the gate is in the second position, discarded soil cannot pass through the opening into the collection area.

In another specific embodiment, the soil collection device is configured so that when the gate is in the second position, discarded soil passes through a soil discarding channel, which is configured to direct discarded soil back to the ground. In another specific embodiment, the discarded soil comprises soil that passes through openings on a surface of a conveyor member on the ground crop harvester and into the collection area of the soil collection device. In another specific embodiment, the soil collection device can further comprise a soil conveying device. The soil conveying device can be positioned remotely from the soil collection area, and can be configured to collect the discarded soil that passes through the openings in the conveyor member and move the excavated soil to the location of the soil collecting device.

In another embodiment, a method of collecting soil samples while harvesting a crop from the ground is provided. The method can comprise removing a layer of soil and crop from the ground; disposing the layer of soil and crop on a conveyor member, the conveyor having a porous transporting surface; moving the transporting surface of the conveyor member to convey the crop to a holding area; discarding at least a portion of the soil from the conveyor member during the act of conveying the crop to the holding area by allowing the soil to pass through the porous transporting surface of the conveyor; collecting at least a portion of the discarded soil in a soil collection device, the soil collection device comprising a plurality of individual containers; and storing the collected soil in one or more of the individual containers.

In another specific embodiment, the method can further comprise printing location identifying information on one or more of the individual containers. The location identifying information can be sufficient to substantially identify at least the approximate location where the stored soil was removed from the ground. In another specific embodiment, the method can further comprise closing an opening through which the discarded soil must pass to be received in the soil collection device after determining that a sufficient amount of soil has been stored in one individual container. In another specific embodiment, the individual containers can comprise sampling bags and the act of storing the collected soil in one or more of the individual containers can comprise opening at least one sampling bag and receiving collected soil in the sampling bag.

The foregoing and other objects, features, and advantages of the invention will become more apparent from the following detailed description, which proceeds with reference to the accompanying figures.

BRIEF DESCRIPTION OF THE DRAWINGS

FIG. 7 shows a partial side view of a back portion of a soil storing system.

FIG. 8 shows a partial side view of a back portion of a soil storing system.

FIG. 9 shows a partial perspective view of a front portion of a soil storing system.

DETAILED DESCRIPTION

As used in this application and in the claims, the singular forms "a," "an," and "the" include the plural forms unless the context clearly dictates otherwise. Additionally, the term "includes" means "comprises." Further, the terms "coupled" generally means electrically, electromagnetically, and/or physically (e.g., mechanically or chemically) coupled or linked and does not exclude the presence of intermediate elements between the coupled items.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Figure 1:
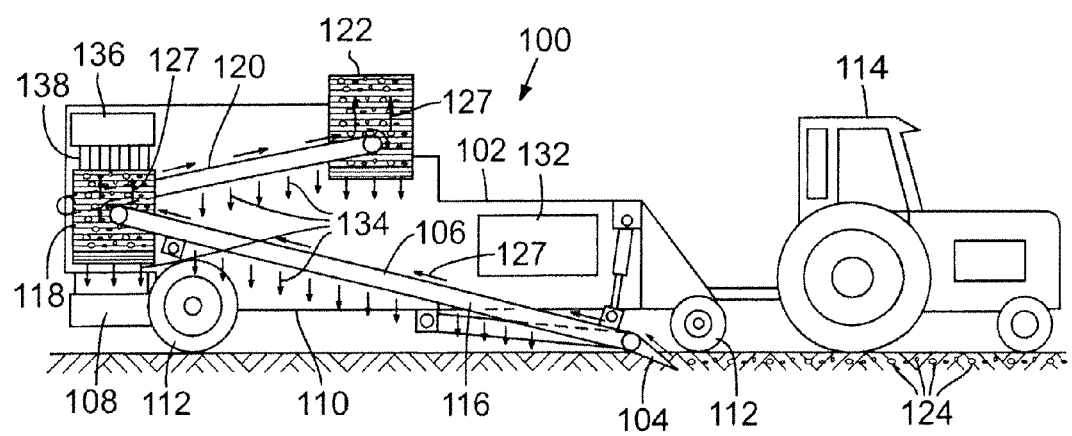
FIG. 1 shows a side view of an apparatus for collecting soil samples attached to a ground crop harvester.

FIG. 1 shows a side schematic view of an apparatus for collecting soil samples while harvesting a crop from the ground. The apparatus 100 includes a crop harvester 102 that includes a digging member 104, a conveyor 106, and a soil sampling device 108. Crop harvester 100 can have a moveable chassis 110, which allows crop harvester 100 to move across a field where a crop is located. Moveable chassis 110 can include wheels 112 to allow the chassis to be moved forward and/or backwards, as desired. Crop harvester 102 can include a motorized mechanism (not shown) for propelling crop harvester 102 forward and/or backwards. Alternatively, crop harvester 102 can be pulled and/or pushed by another motorized mechanism, such as tractor 114.

Figure 2:
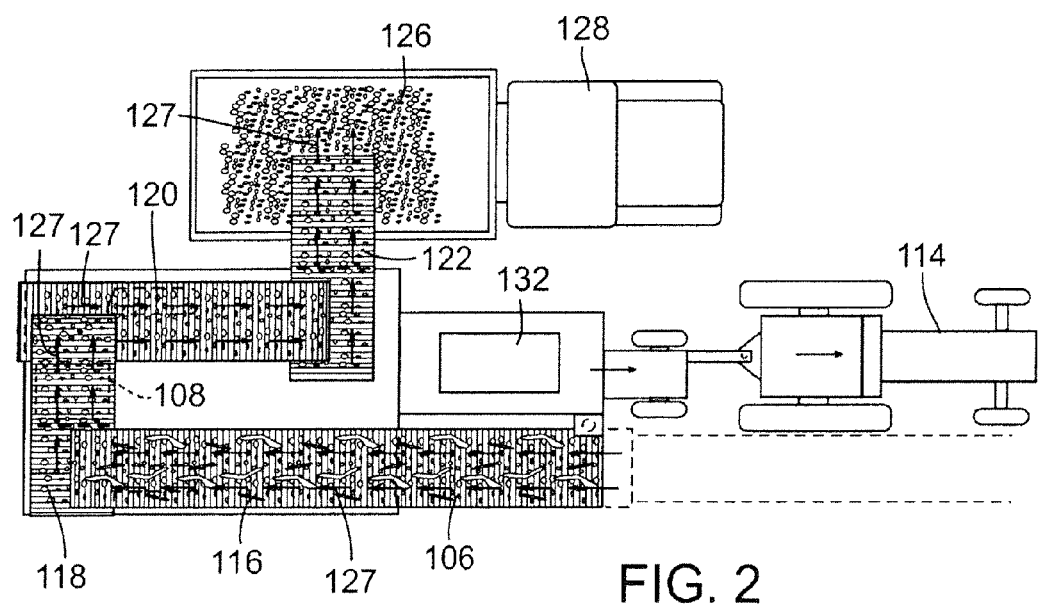
FIG. 2 shows a top view of an apparatus for collecting soil samples attached to a ground crop harvester.

Conveyor member 106 can comprise one or more conveying systems, such as the four conveyor belts 116, 118, 120, 122 shown in FIGS. 1 and 2. Harvester 100 can include a conveyor 104. Harvester 100 can be used to harvest a variety of crops from the ground, including root crops such as the potatoes shown in FIGS. 1 and 2. The soil capturing embodiments disclosed herein can be used to capture soil for any crop that is pulled, cut, removed, or otherwise collected in such a manner that soil is extracted from the ground in the course of harvesting the crop.

As shown in FIG. 1, potatoes 124 can be unearthed or excavated from the ground using digging member 104. In particular, in one embodiment, digging member 104 can extend into the ground and, in conjunction with the forward movement of harvester 100, cause potatoes 124 to move upwards out of the ground. After being excavated from the ground, potatoes 124 can move along an upper surface of the digging member 104 and onto first conveyor belt 116. Inevitably, as digging member 104 cuts into the earth, the cutting and/or digging action of digging member 104 causes soil to be excavated from the ground along with potatoes 124.

Traditionally, the primary purpose of conveyor member 106 is to move potatoes from the ground to a potato collection area (i.e., potato collection area 126, described below). In moving the potatoes from a first location (e.g., the ground) to a second location (e.g., potato collection area), however, the harvester 100 also transports soil that has been excavated from the ground along at least a part of the distance between the first location and the second location. Soil collecting device can be configured to capture soil that is discarded (or otherwise removed from the harvester) prior to reaching the potato collection area.

As discussed above, digging member 104 excavates soil and potatoes from the ground and moves the soil and potatoes to conveyor member 106. In the embodiment shown in FIGS. 1 and 2, first conveyor belt 116 moves (conveys) both the excavated soil and potatoes 124 along the length of the harvester 100. Conveyor belt 116 is desirably configured at an angle from the ground, so that conveyor belt 116 causes the soil and potatoes 124 to rise to a higher location on harvester 100. That is, conveyor belt 116 can be at a lower height relative to the ground at the front of harvester 100 and at a higher height relative to the ground at the back of harvester 100. As the soil and potatoes reaches the end (top) of the first conveyor belt 116, the soil and potatoes 124 can be dropped onto a second conveyor belt 118. Second convey belt 118 moves or conveys the soil and potatoes 124 at a ninety degree angle from first conveyor belt 116, causing the soil and potatoes 124 to move across the body of harvester 100. Like first conveyor belt 116, second conveyor belt 118 is desirably at a raised angle from the ground, thereby causing the soil and potatoes 124 to move to a higher height relative to the ground.

Upon conveying the soil and potatoes 124 across the body of harvester 100, the second conveyor belt 118 can drop the soil and potatoes 124 onto a third conveyor belt 120. Third conveyor belt 120 can be disposed at a ninety degree angle from the second conveyor belt 118 and can move (convey) the soil and potatoes 124 back to the front of harvester 100. Third conveyor belt 120 is also desirably configured at a raised angle from the ground, thereby causing the soil and potatoes 124 to, once again, move to a higher height relative to the ground. After the soil and potatoes 124 reach the end of third conveyor belt 120, they can be dropped onto fourth conveyor belt 122.

Fourth conveyor belt 122 can be disposed at a ninety degree angle from third conveyor belt 120 and can move (convey) the soil and potatoes across the body of harvester 100 in the same direction as second conveyor belt 118. After the soil and potatoes reach the end of fourth conveyor belt 122, they can be dropped into a potato collection area 126. Potato collection area 126 can be associated with a second moveable vehicle 128, such as a truck. Alternatively, potato collection area 126 can be coupled to or otherwise a part of harvester 100 itself.

Each of the first, second, third, and fourth conveyor belts can be coupled to chassis 110 of harvester 100. In addition, the first, second, third, and fourth conveyor belts can be driven or powered by a conveyor motor 132, which is also mounted or otherwise coupled to chassis 110 of harvester 100. Although harvester 100 is shown with four conveyor belts, harvester 100 can comprise any number of conveyor belts, including more or fewer conveyor belts than are shown in FIG. 1. In its simplest configuration, for example, a harvester can comprise a single conveyor belt operating to move potatoes to the rear of the harvester where a potato collection area can be located.

In addition to having any number of conveyor belts (or other conveying mechanisms), the conveyor belts can be configured to move or transport potatoes (or other crops) in configurations and paths other than those shown in FIGS. 1 and 2. For example, the first conveyor belt can be wider than shown in FIGS. 1 and 2 so that a larger swath of the field can be harvested in a single pass. In addition, the conveyor belts can convey potatoes to a potato collection device at a location other than that shown in FIGS. 1 and 2. Two such harvesters that can be used in accordance with the soil sampling devices disclosed herein are the SPUDNIK 6400, available from SPUDNIK Equipment Company LLC in Blackfoot, Id. and the Lockwood 474, available from Lockwood Mfg. in West Fargo, N.D.

As noted above, soil that has been excavated from the ground by digging member 104 moves with potatoes 124 up conveyor member 106. Some of the soil that makes its way onto the conveyor belts moves directly from the ground to conveyor member 106. In addition, soil that is initially stuck or associated with excavated potatoes can be separated from the potatoes as the potatoes and soil travel along conveyor member 106.

Although having some soil on the conveyor belts can provide a cushion for potatoes 124 as they travel up conveyor belts, it is desirable to return the majority of the soil to the earth prior to collecting potatoes 124 in the potato collection area 126. In order to return the soil to the ground, conveyor belts 116, 118, 120, and 122 can be formed with openings so that the transporting surface of conveyor member 106 have porous surfaces. The porous transporting surfaces of the conveyor belts permit the excavated soil to fall through the conveyor belts to the ground as the conveyor belts convey potatoes 124 towards the potato collection area 126. Arrows 127 indicate the direction of travel of the excavated soil and potatoes on the transporting surface of conveyor member 106 and arrows 134 show the direction that the soil travels as it falls downward through the openings in the transporting surfaces of the various conveyor belts.

The soil sampling device 108 can be positioned at a location beneath conveyor member 106 so that it can receive excavated soil that falls through openings on the transporting surfaces of the conveyor belts. FIGS. 1 and 2 show the soil sampling device 108 positioned under the second conveyor belt 118. However, soil sampling device 108 can be positioned at other locations under any of the other conveyor belts. For example, soil sampling device 108 could be positioned underneath the first, third, or fourth conveyor belts. Depending on the amount of soil to be collected, or the type of soil being sampled, it may be desirable to position the soil collecting at a location nearer digging member 104 or further from digging member 104. If each of the conveyor belts has a porous surface, as the potatoes move further up the conveyor member 106, less soil may be available to sample. This can be especially true if the soil being sampled is particularly sandy. Accordingly, it is desirable to position the soil sampling device 108 at a location on conveyor member 106 where sufficient amounts of soil are available for collection.

In one embodiment, soil sampling device 108 can be positioned beneath a soil separating device 136. Soil separating device 136 can have a plurality of rubberized fingers 138 (or other agitating members) which function to remove soil from the potatoes prior to collecting the potatoes in potato collection area 126. By positioning the soil sampling device 108 beneath soil separating device 136, the agitating, soil-removing action of soil separating device 136 can ensure that there is sufficient soil available to collect and store.

Figure 3:
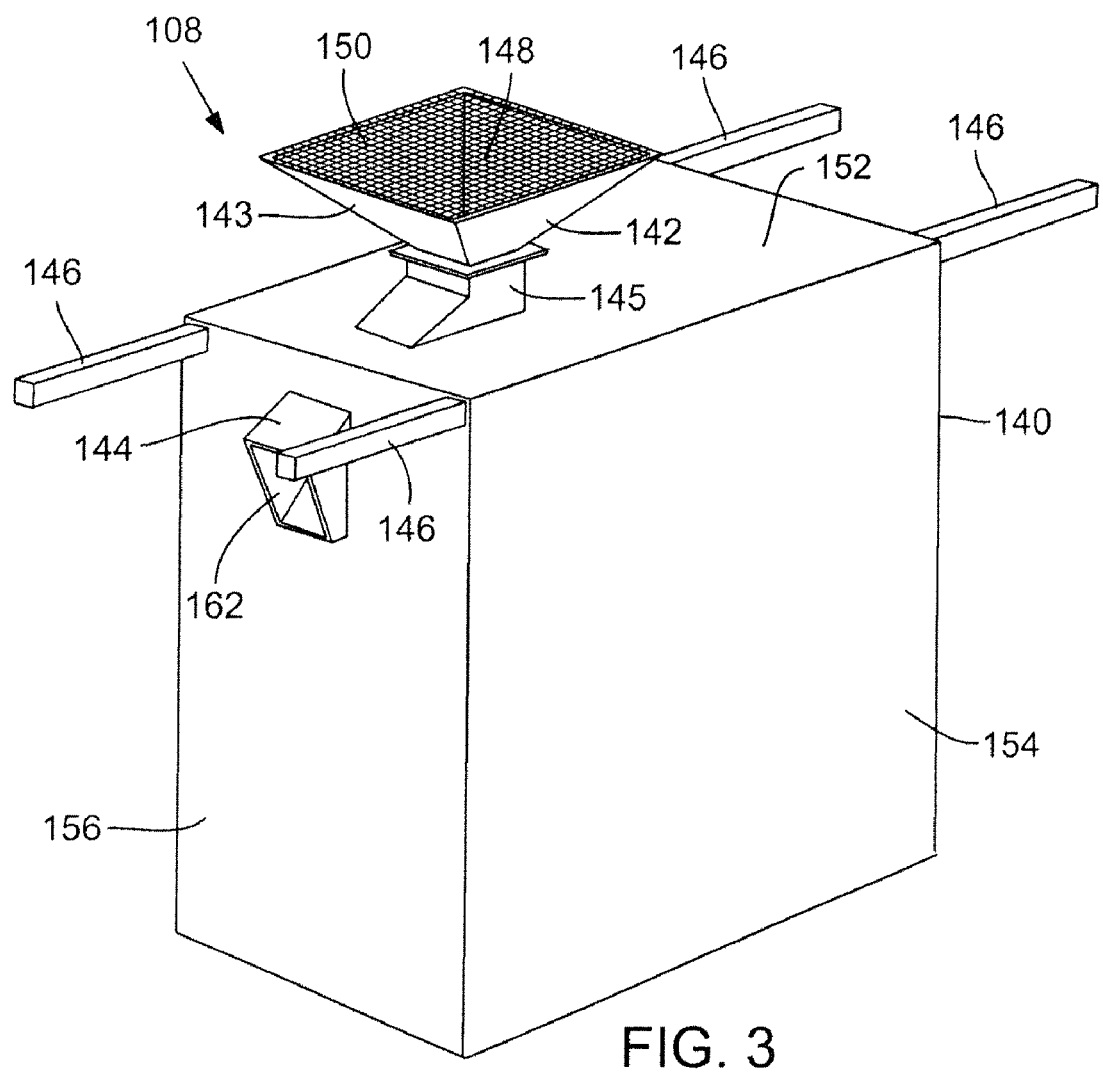
FIG. 3 shows a perspective view of an apparatus for collecting soil samples.

FIG. 3 shows an embodiment of a soil sampling device. Soil sampling device 108 can comprise a housing 140 that includes a soil directing device 142, and connecting members 146. Soil directing device 142 can comprise a funnel shaped member 143 and a soil diverting portion 145 that includes a soil diverting channel 144. Soil directing device 142 can have an opening 148 that is wider at a top portion than at a bottom portion. By having a larger opening at a top portion, soil directing device 142 can more easily collect a sufficient amount of soil from a soil transporting surface (e.g., a porous conveyor member). In addition, the narrower opening at the bottom portion permits the soil collected in the soil directing device 142 to be more easily directed to a soil containing system, as discussed in more detail below.

Soil directing device 142 desirably has a porous cover 150 positioned on top of opening 148. Porous cover 150 is desirably configured to prevent larger soil clots or stones from entering into soil directing device 142. Porous cover 150 can be, for example, a mesh screen that is removable and/or replaceable. The mesh screen can be easily changed or modified to match various soil types and field conditions.

Soil diverting channel 144 can include an opening that is, at least at certain times, in fluid communication with the opening 148 of soil directing device 142. In this manner, the soil sampling device 108 can be adaptable to maintain a desired soil sampling rate. In particular, a control gate or diverter (discussed in more detail below) can be configured to direct excess soil out of the soil directing device 142 via soil diverting channel 144. When the diverter is activated, soil is directed from the soil directing device 142, through the soil diverting channel 144, and back onto the field from which the soil was removed.

Connecting members (mounting members) 146 are configured to mount the soil sampling device 108 to a harvester 100. As shown in more detail in FIG. 4, connecting members 146 can comprise two bars which pass outside of opposing sides of the soil sampling device 108. In the embodiment shown in FIG. 3, connecting members 146 are configured to rest on a supporting surface of the harvester 100. However, connecting members (mounting members) can be configured to attach to the harvester (or other digging/excavating machine) in any conventional manner that would be known to one of ordinary skill in the art.

If desired, connecting members (mounting members) can include additional securing means. The additional securing means can be configured to more rigidly secure soil sampling device 108 to harvester 100. For example, a variety of mechanical fasteners (e.g., bolts, screws, zip-ties, etc.) could be used to further secure soil sampling device 108 to harvester 100.

Soil sampling device 108 can be completely or at least mostly enclosed, as shown in FIG. 3. By substantially enclosing soil sampling device 108 as shown in FIG. 3, soil sampling device 108 can be better protected from the elements. In addition, enclosing soil sampling device 108 can help to prevent soil and other contaminants from entering the interior of soil sampling device 108 and interfering with the functioning of its mechanical and/or electrical components. Accordingly, soil sampling device 108 desirably has a top cover 152, side covers 154, 156, two additional side covers (not shown), and a bottom cover (not shown).

Figure 4:
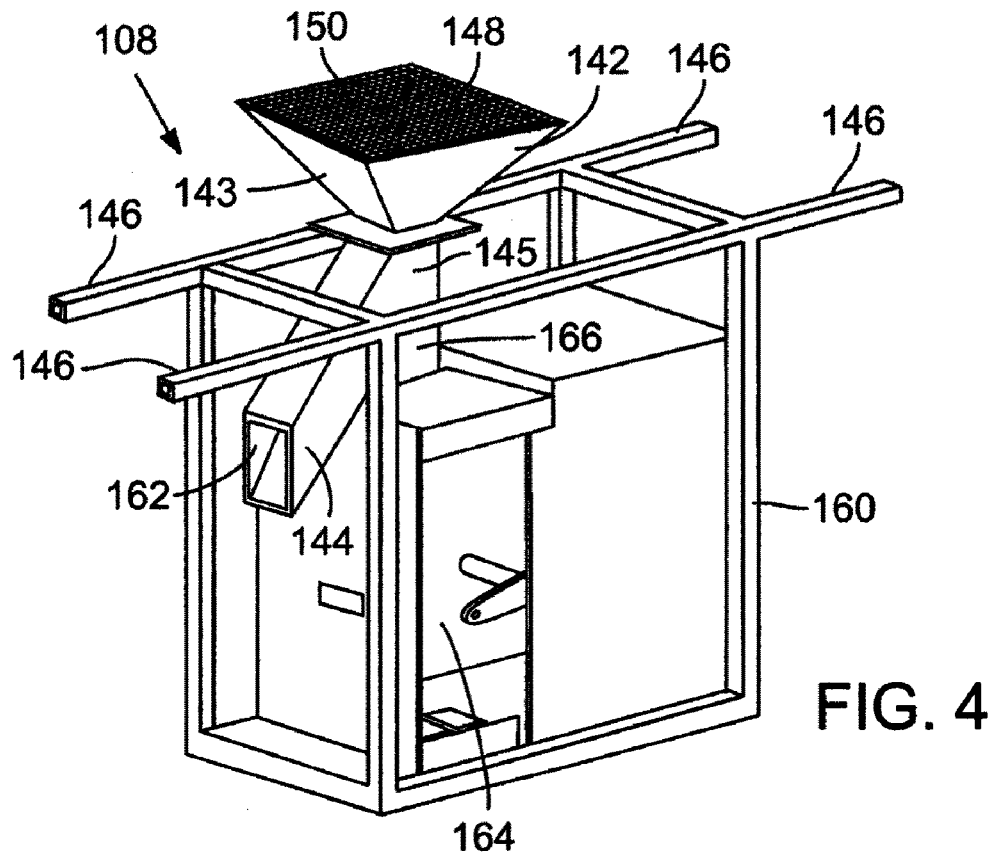
FIG. 4 shows a perspective view of the apparatus for collecting soil samples shown in FIG. 3, with portions removed.
Figure 5:
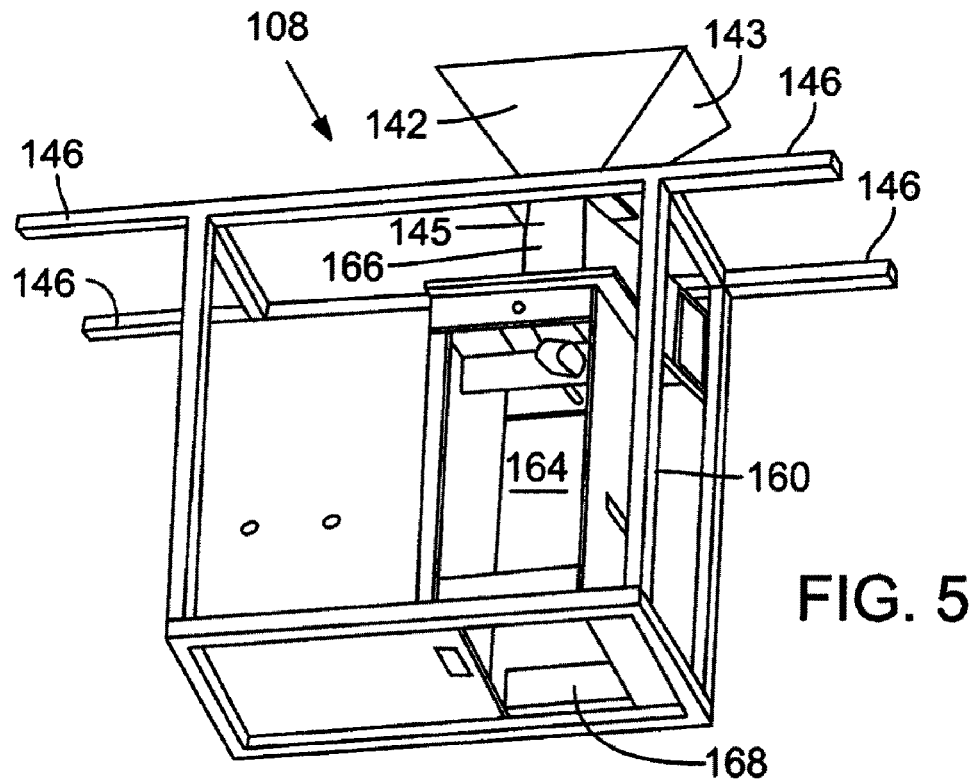
FIG. 5 shows another perspective view of the apparatus for collecting soil samples shown in FIG. 3, with portions removed.

FIG. 4 shows soil sampling device 108 with top cover 152 and side covers 154, 156 removed for purposes of illustration. Connecting members 146 can be part of a frame structure 160. By forming connecting members 146 integrally with frame structure 160, soil sampling device 108 can have a greater overall structural stability. However, connecting members 146 can also be formed separately and coupled to the soil sampling device 108 if desired.

As seen in FIG. soil diverting portion 145 desirably includes a soil diverting channel 144 and a soil collection channel 166. Soil collection channel 166 feeds or directs excavated soil from opening 148 to soil collection area 164. When soil sampling device 108 is not turned on or when it has been determined that sufficient soil has already been collected, a control gate or diverter (discussed in more detail below) can be configured to direct soil from soil directing device 142 to soil diverting channel 144. Soil discarding channel 142 has an opening 162, and excavated soil that is directed into soil discarding channel 142 passes through opening 162 and returns to the ground.

Beneath the soil directing device 142 is a soil collection area 164. Soil that is not diverted to the soil diverting channel 144 passes through collection channel 166 and enters into soil collection area 164, where it can be collected and stored in a container or other storage device as discussed in more detail below.

Containers of soil can be collected and held in soil collection area 164. Alternatively, an opening 168 can be formed in the bottom of soil collection area 164, and containers of soil can be dropped out of soil sampling device 108 onto the ground. Once the containers are dropped on the ground, the containers of soil can be collected at the operator's convenience. Desirably, however, soil collection area 164 has sufficient space to store the containers of excavated soil. If desired, the containers of soil can be filled and then moved to another location in soil sampling device 108. For example, a bottom surface of soil collection area 164 can be formed at an angle relative to the ground, so that gravity will naturally move containers that have been filled with soil to a different location within soil sampling device 108.

Figure 6A:
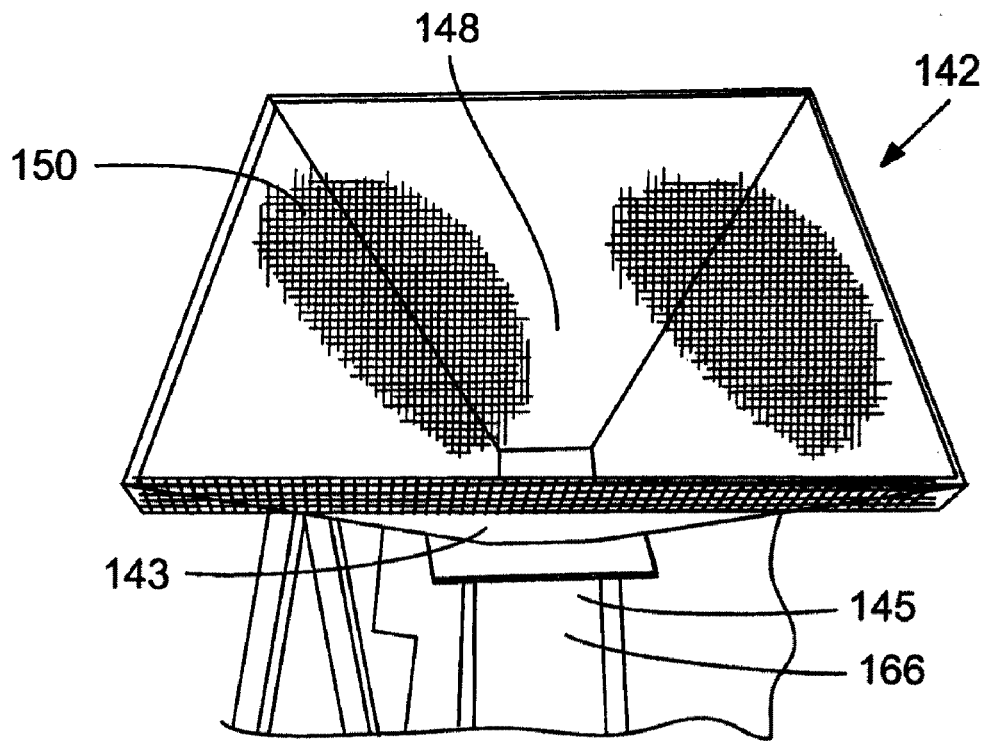
FIG. 6A shows a perspective view of a top portion of an apparatus for collecting soil samples.
Figure 6B:
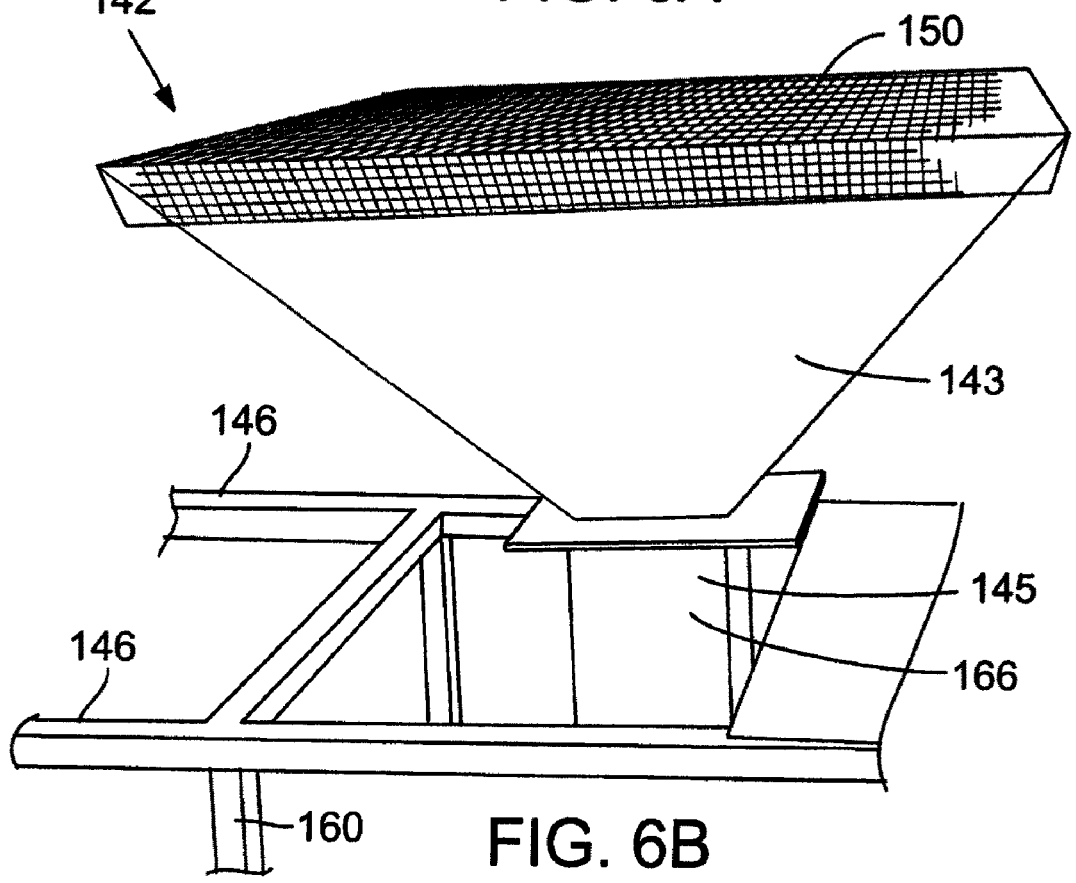
FIG. 6B shows a perspective view of a top portion of an apparatus for collecting soil samples.

FIGS. 6A-6D show the soil directing device 142 in additional detail. As noted above, soil directing device 142 can have a porous cover 150 to prevent larger soil clots or stones from entering into soil sampling device 108 through opening 148. For clarity, FIGS. 6A and 6B show soil diverting portion 145 without a mechanism for diverting unwanted or unneeded excavated soil (e.g., soil diverting channel 144). FIG. 6A shows a partial cut-away of the porous cover 150, to show the location of opening 148 in the top of the soil directing device 142. FIG. 6B shows a side perspective view of the soil directing device 142. After soil passes through the mesh screen 150 and into the funnel shaped member 143 of the soil directing device 142, it passes into collection channel 166 (assuming the soil is not otherwise diverted or re-directed as discussed below).

Figure 6C:
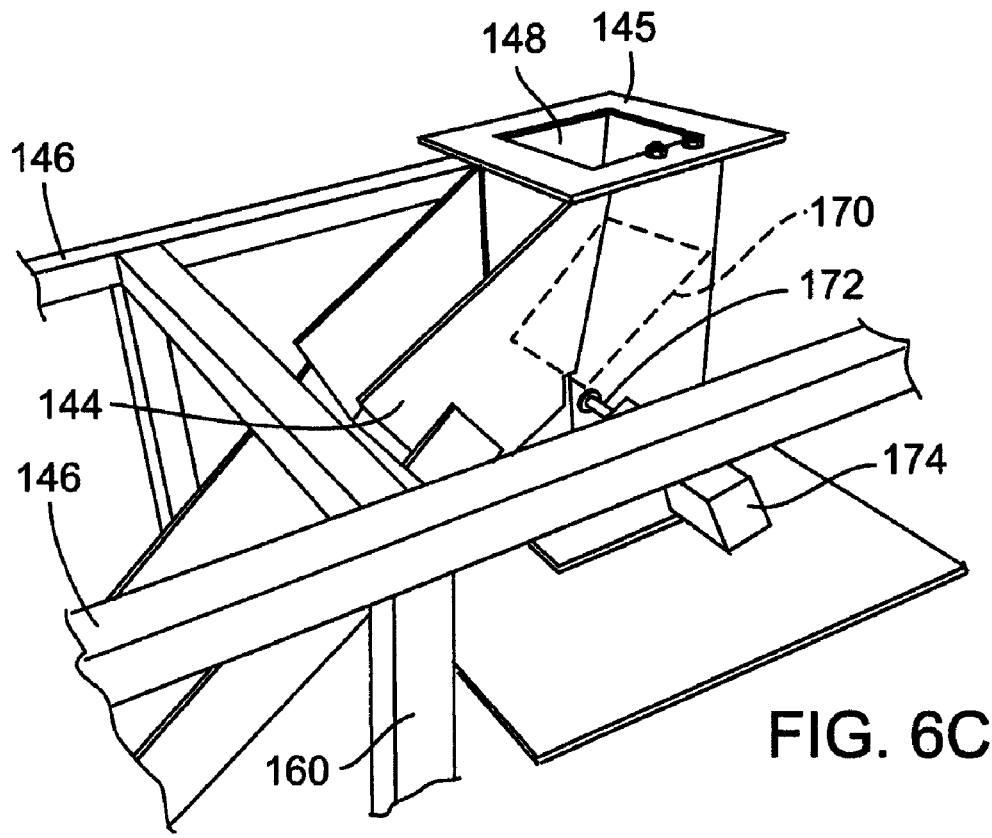
FIG. 6C shows a perspective view of a top portion of an apparatus for collecting soil samples.
Figure 6D:
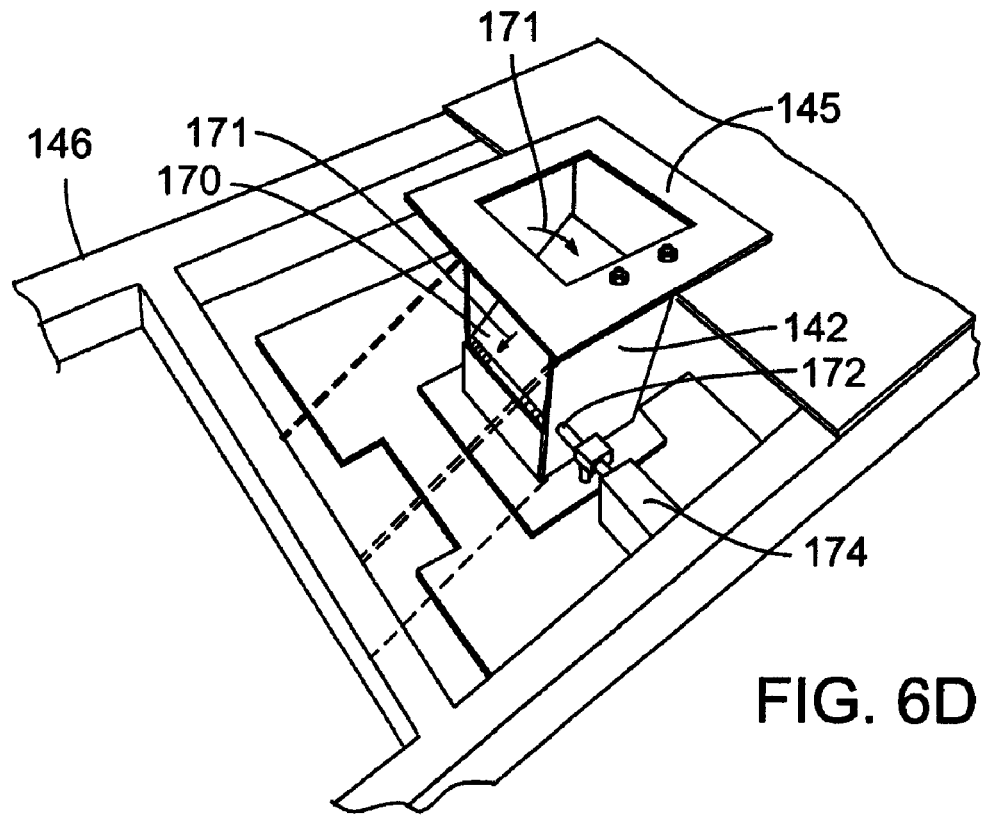
FIG. 6D shows a perspective view of a top portion of an apparatus for collecting soil samples.
Figure 10:
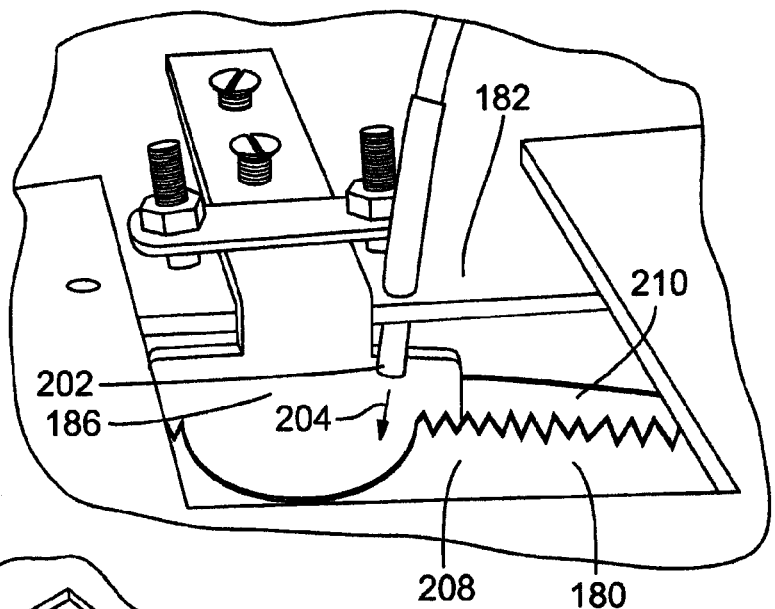
FIG. 10 shows a partial view of a top portion of a soil storing system, including a bag opening device.

Desirably, soil diverting portion 145 includes a gate or diverter, so that excess excavated soil can be forced to bypass collection channel 166 and return to the ground. FIGS. 6C and 6D show the soil diverting portion 145 without funnel shaped member 143 to illustrate the orientation of soil diverting channel 144 relative to opening 148. As shown in FIG. 6D, soil diverting portion 145 can have a diverter 170. Diverter 170 can be pivotably coupled to an inside surface of soil directing device 142 by, for example, pivot pin 172. A motor 174 can drive diverter from a first position (a non-diverting or open position) to a second position (a diverting or closed position). By moving between the first and second positions, diverter 170 can regulate the amount of soil that enters into collection channel 166.

Diverter 170 can be configured to regulate soil flow in a variety of manners. In the simplest embodiment, diverter 170 can be used to turn soil sampling device 108 "off" and "on." When soil sampling device 108 is turned "off," diverter 170 is a position that directs soil from the opening 148 into soil diverting channel 144, which prevents soil from being collected and stored in soil sampling device 108. When soil sampling device 108 is turned "on," diverter 170 is in a position that allows soil to enter the soil collection channel 166 from opening 148.

Alternatively, diverter 170 can operate to allow (or not allow) soil to enter soil collection channel 166 using a variety of other measurements. For example, a soil flow control member can calculate the weight of soil collected in a container using, for example, a weight sensor beneath the container (e.g., a soil weighing mechanism 218, as shown in FIG. 11). When the soil flow control member determines that the predetermined weight limit has been met, the soil flow control member can operate motor 174 and causes diverter 170 to pivot about pivot pin 172, thereby closing the collection channel 166. By pivoting diverter 170 to a closed position (as shown in FIG. 6D), soil entering into opening 148 will pass directly to soil diverting channel 144, as shown by the direction arrows 171. Accordingly, when diverter 170 is in the closed position, soil entering opening 148 passes directly into soil diverting channel 144 and falls through opening 162 back to the ground.

FIGS. 7-9 illustrate an embodiment of a container system for capturing soil that passes through soil collection channel 166. In this embodiment, the excavated soil can be collected into sampling bags 180. As best seen in FIG. 8, one or more sampling bags 180 can be held within a sampling bag storing area (container storage area) 182. Sampling bags 180 desirably folded like traditional grocery store bags so that a large number of sampling bags 180 can be stored in the relative small space of sampling bag storing area 182. The sampling bag storing area 182 comprises a bottom surface 184, a front bag holding member 186, and a rear bag holding member 188. Sampling bags 180 can be captured between front bag holding member 186 and rear bag holding member 188. Rear bag holding member 188 can comprise an automated system (e.g., a spring member 189 or other biasing member) that operates to push sampling bags 180 from the rear. Accordingly, in operation, when a sampling bag is filled with collected soil, rear bag holding member 188 can push against the back of the other, unused sampling bags, thereby forcing another bag into a container filling area (position) beneath collection channel 166. Bottom surface 184 can also help support sampling bags 180. If desired, the automated delivery system of sampling bags can include a motorized advancement mechanism.

Desirably, a lower pushing mechanism 190 is provided to help push bags into position. Because the thickness of the sampling bags can vary from the top to the bottom, lower pushing mechanism 190 can assist the loading of new bags into position beneath collection channel 166. Lower pushing mechanism 190 can be a linear actuator that includes a motor 190, a telescoping section 192, and a plate section 194 coupled to telescoping section 192. When a new bag is ready to be moved into position, motor 190 can drive telescoping section in the direction of arrow 196, which causes plate section 194 to push against the back of the bags contained in the sampling bag storing unit 182, forcing a new bag into position beneath collection channel 166. If desired, optical sensor guides 198 can be positioned at a bottom area of sampling bag storing unit 182 to guide the amount of pushing that is required by lower pushing mechanism 190. In addition, optical sensor guides 198 can indicate (for example, by beeping) when there are no more sampling bags contained in sampling bag storing area 182.

Sampling bags are desirably formed with a U-cut 200 to facilitate the opening of a sampling bag when a sampling bag is moved into position beneath soil collection channel 166 to receive excavated soil. In addition, one or more assisted bag opening devices can be used to help fully open sampling bags 180. In one embodiment, a bag opener comprises a tube 202 that is connected to an air compressor (not shown). The air compressor is configured to provide an amount of compressed air to the tube 202 (in the direction of arrow 204) to help open sampling bag 180. By firing an amount of compressed air between a front portion 208 and back portion 210 of a sampling bag 180, the front and back portions 208, 210 of the sampling bag 180 can be separated from one another. Tube 202 is desirably connected to a top surface of sampling bag storing unit 182 and positioned at the end front end of sampling bag storing unit 182.

Figure 11A:
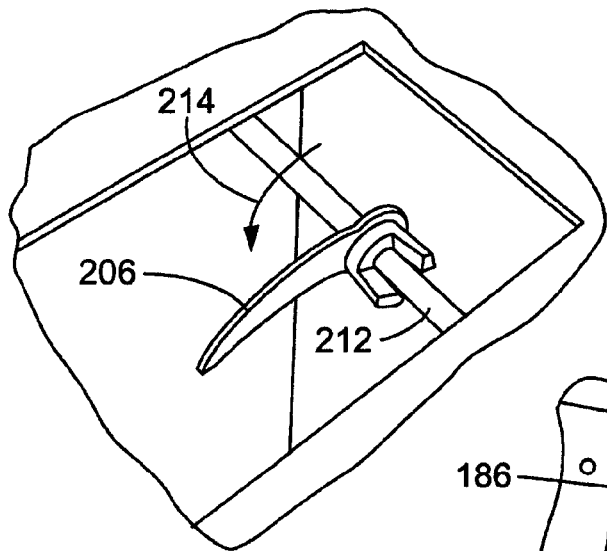
FIG. 11A shows a partial perspective view of a top portion of a soil storing system, including another bag opening device.
Figure 11B:
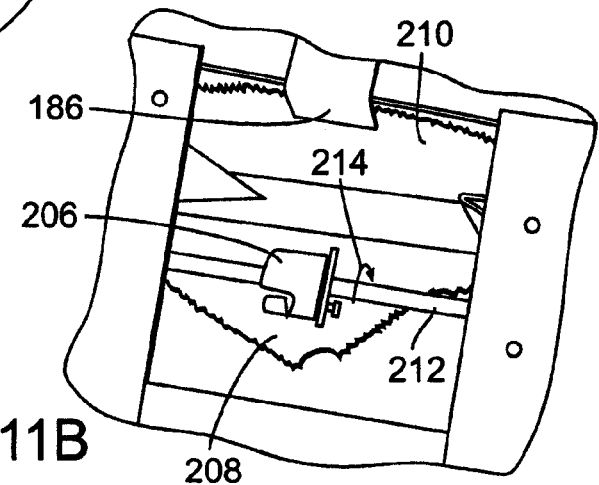
FIG. 11B shows a partial top view of a top portion of a soil storing system, including the bag opening device of FIG. 11A.

Referring to FIGS. 11A and 11B, another bag opener is disclosed. This second bag opening can be used in addition to tube 202 or as an alternative to tube 202. The second bag opener can comprise a hook member 206 that is positioned above the opening of the sampling bags. Hook member 206 can be configured to extend between front portion 208 and back portion 210 of a sampling bag 180. As shown in FIG. 11B, hook member can rotate about a rod member 212 (in the direction of arrow 214), which suspends hook member above sampling bags 180. Hook member 206 is desirably suspended above a central area of the sampling bags 180, so that hook member 206 can extend into the opening of a sampling bag 180 at or about its center. Hook member 206 can be configured to hold a sampling bag 180 in the open position until the sampling bag is filled to a predetermined amount (as discussed below). Hook member 206 can be driven by a motor (not shown).

Figure 12:
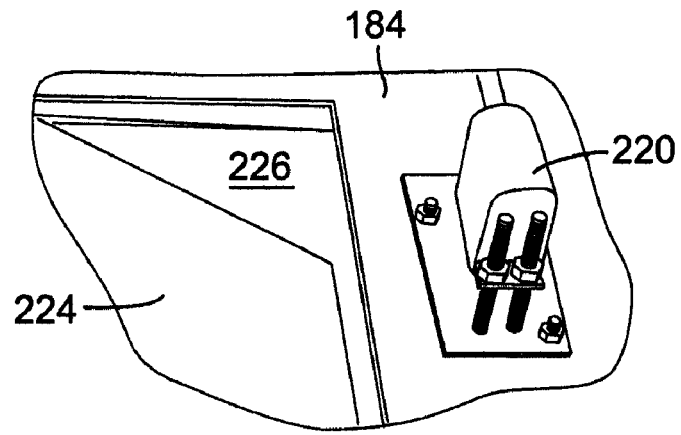
FIG. 12 shows a partial top view of a bottom surface of a soil storing system, including a flap that can open and close.
Figure 13:
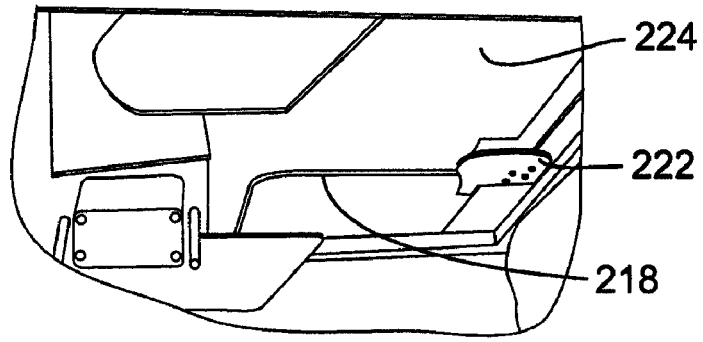
FIG. 13 shows a partial bottom view of the bottom surface of the soil storing system of FIG. 12.

FIGS. 12 and 13 illustrate a soil weighing mechanism and a bag dropping mechanism. The system is desirably configured so that once a predetermined amount of soil enters a sampling bag, soil collection channel 166 is closed (i.e., soil is diverted from soil collection channel 166 as discussed above) and the soil-containing sampling bag 180 is moved out from under soil collection channel 166 so that a new bag can be moved into position. A soil weighing mechanism 218 can be positioned underneath bottom surface 184 to monitor the weight of the bag and collected soil. Soil weighing mechanism 218 can comprise, for example, a Flexforce® weight sensor and can be configured to weigh a sampling bag that contains collected soil. Desirably, the soil weighing mechanism 218 weights the sampling bag continuously. Once soil weighing mechanism 218 determines that the sampling bag has reached a predetermined limit, servomotor 220 opens a latch 222, which causes a flap 224 in bottom surface 184 to open. The opening of flap 224 causes the filled sampling bag to drop through an opening 226 in bottom surface 184. Desirably, a motorized mechanism causes the flap 224 to open and is configured to return flap 224 to the closed position after the sampling bag passes through opening 226.

Opening 226 can lead directly to the field and the filled sampling bag(s) can be collected from the field at a later time, as discussed above. Alternatively, a filled bag collection area can be positioned beneath opening 226 and filled bags that drop through opening 226 can be stored in the filled bag collection area. If desired, the filled bag collection area can have a slanted surface so that the filled bags do not stack upon one another, but instead slide away from opening 226.

Figure 14:
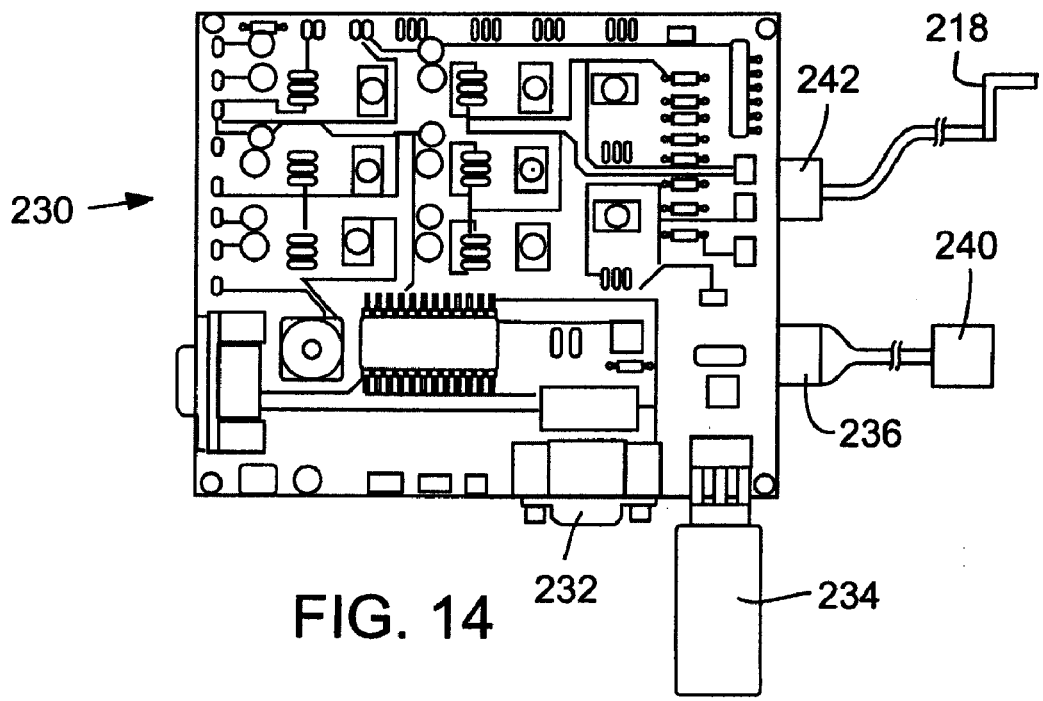
FIG. 14 shows a circuit board for use with a soil sampling device.

FIG. 14 illustrates a schematic circuit board 230 that can be used in conjunction with the embodiments discussed above. Desirably, circuit board 230 includes a global positioning system (GPS) input 232. By connecting circuit board 230 with a GPS device that transmits and receives signals, it is possible to acquire accurate information about the geographic location of the soil sampling device 108 at the time a particular soil sample was excavated from the ground and/or collected and stored in a sampling bag. A memory device 234 (such as a conventional memory stick device) can be inserted into a slot on circuit board 230 and GPS data can be recorded by memory device 234. A printer cable 236 can be configured to be connected to circuit board 230 to connect a printing device 240 to the circuit board 230. As discussed in more detail below, printing device 240 can print location information onto a sampling bag 180 input to the circuit board 230 via the GPS input 232.

The location information provided by the GPS device and printed onto the sampling bag 180 (or other container) can be sufficient to substantially identify at least the approximate location where the soil was excavated from the ground. The GPS information can reflect the location of the GPS device at the time the soil is excavated, the time the location information is printed onto the sampling bag, or at some time in between (or just outside) of those events. Because the harvester (or other moveable member) may move a certain distance from the time the soil is excavated to the time the soil is collected in the soil collecting device, the geographic location printed on the bag may not reflect the exact geographic location where the soil was excavated; however, it can desirably substantially identify at least the approximate geographic location.

In addition, the circuit board 230 can comprise a soil flow control member, discussed above. For example, soil weighing mechanism 218 can be electrically coupled to a soil flow control member portion 242 of circuit board 230, and soil flow control member portion 242 can be configured to open or close diverter 170 based on the weight information received from soil weighing mechanism 218.

Figure 15:
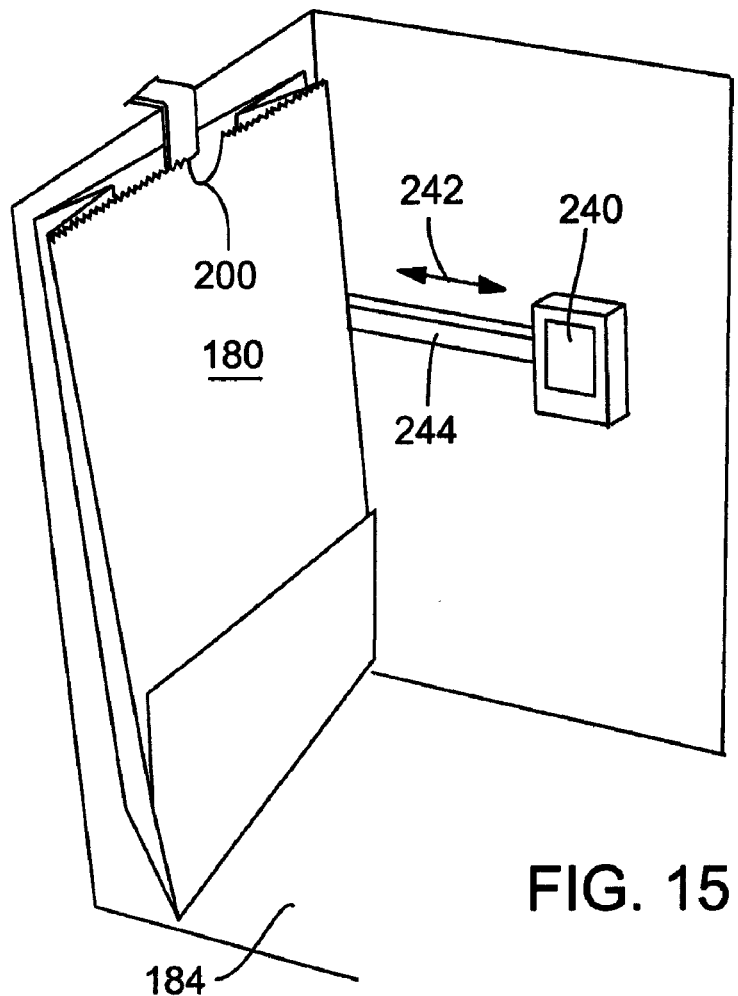
FIG. 15 shows a front view of a soil storing system, including a printer device for printing information on a surface of the sampling bags.

FIG. 15 illustrates a mechanism by which accurate GPS data and other information can be printed directly onto the sampling bags 180. A printer device 240 can be coupled to a side surface of sampling bag storing area 182. Printer device 240 can be configured so that it can move back and forth along the side surface (in the directions of the double-headed arrow 242). Tracks 244, for example, can be coupled to the side surface of the sampling bag storing area 182 and printer device 240 can move along tracks 244. Printer device 240 can be configured so that it can move adjacent to a sampling bag 180 and print information onto that bag. Printer device 240 can be configured to print information on a sampling bag either before or after it is filled with soil. Desirably, printer device 240 is linked to a GPS device and can print geographic location information determined from a GPS device directly onto the bag. Alternatively, printer device 240 can be configured to print such information onto an intermediate label (e.g., an adhesive label), which can then be secured or attached to the sampling bag 108. In addition to printing geographic location identifying information onto the sampling bags, the printer can print other information about the soil sample onto the bag and/or label, including, for example, sample numbers, the weight of soil collected, and other identifying information.

Figure 16:
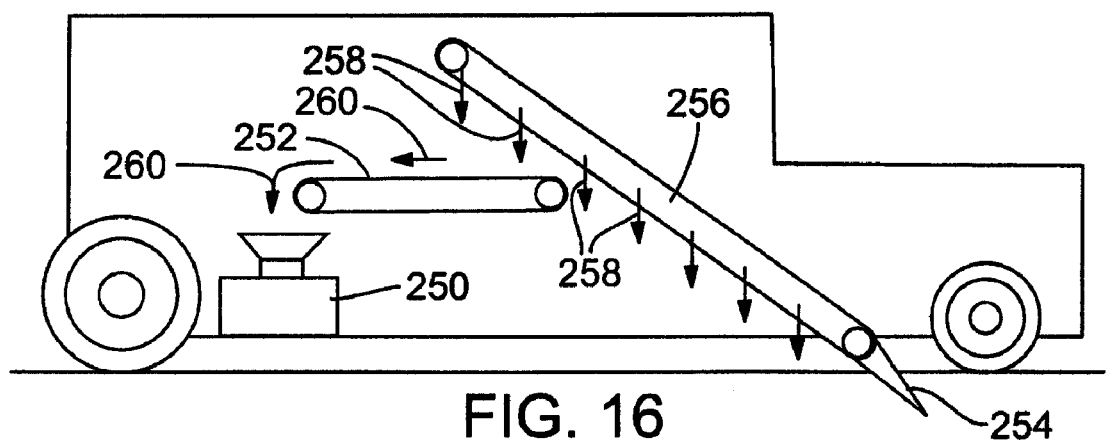
FIG. 16 shows a schematic side view of a soil sampling device, including a soil conveying device to convey soil from one location to another remote location where the soil sampling device is located.

FIG. 16 shows another embodiment of a soil sampling device 250. Soil sampling device 250 can have a structure similar to the soil sampling device discussed above, except that soil sampling device 250 further comprises a soil conveying device 252. Soil conveying device 252 can be, for example, another conveyor belt. Alternatively, soil conveying device 252 can be a tube or other channel that is capable of moving collected soil from a first location to a second location. The movement or transport of the collected soil can be achieved by gravity or other external forces (such as by forcing compressed air into a tube). By using soil conveying device 252 to transport soil from one location to another, the soil sampling device 250 can be positioned at a remote distance from the location where the soil is initially collected.

As shown in FIG. 16, a digging member 254 excavates a combination of soil and crop from the ground. The excavated soil and crop can move onto a conveyor member 256. As discussed above with regard to other conveyor members, conveyor belt 256 can have a porous surface that allows the excavated soil to fall through the surface of conveyor belt 256, as shown by direction arrows 258. Rather than passing directly to a soil sampling device, however, the excavated soil can be collected by a soil conveying device 252 (e.g., a secondary conveyor belt with a substantially non-porous surface). The soil that is collected by soil conveying device 252 can be moved (conveyed) towards soil sampling device 250, as indicated by direction arrows 260. After the excavated soil is conveyed to soil sampling device 250, soil sampling device 250 can collect and store the excavated soil in the manner discussed above with regard to the other embodiments.

The soil sampling device can be positioned at any convenient location on a harvester or other crop gathering mechanism. So long as that mechanism excavates an amount of soil from the ground, the soil sampling device can be positioned to capture or collect the excavated soil. In addition, because the device can be configured to transport excavated soil from a first location to a second location (as shown in FIG. 14), the soil sampling device disclosed herein can be positioned at a remote location away from the source or location of the excavated soil. Also, the soil sampling device can be configured to operate and function with a moveable chassis other than a harvester or other such crop gathering mechanism. For example, the soil sampling device can be configured to capture soil that is excavated from the ground in any process, and that excavated soil can directly collected and/or conveyed to the soil sampling device for collection and storage, as discussed in detail above.

Since the soil sampling devices described above can obtain soil samples from any mechanism or apparatus that digs up soil (such as while harvesting a crop), operation of the soil sampling device by a user is greatly simplified and can be conveniently combined with the operation of another functional machine (e.g., a harvester). For example, after attaching the soil sampling device 108 at the appropriate location on a moveable apparatus, the user can simply turn the soil sampling device on, load sampling bags into the unit, set a soil sampling rate (or use a default setting), and continue to operate the moveable apparatus (e.g., harvester) as usual. Accordingly, efficient and effective soil sampling can be achieved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. An apparatus for collecting soil samples while harvesting a crop from the ground, the apparatus comprising:
    a moveable chassis;
    a digging member coupled to the moveable chassis, the digging member being configured to enter the ground and excavate a combination of soil and crop from the ground;
    a conveyor member coupled to the moveable chassis, the conveyor member having a transporting surface that is configured to receive at least a portion of the excavated combination of soil and crop, at least a portion of the transporting surface having openings that extend through the transporting surface, the openings being sufficiently large to allow at least a portion of the excavated soil to pass through the openings; and
    a soil collecting device coupled to the moveable chassis, the soil collecting device being configured to collect and store at least a portion of the excavated soil that passes through the openings on the transporting surface of the conveyor member.

2. The apparatus of claim 1, wherein the soil collecting device further comprises a soil containing system, the soil containing system comprising a plurality of individual containers that are configured to receive the collected soil.

3. The apparatus of claim 2, wherein the soil containing system is configured to receive the collected soil in one individual container at a time, the soil container system further comprising an automated system for advancing individual containers from a first location to a second location,
    wherein the first location is a container storage area and the second location is a container filling area.

4. The apparatus of claim 2, wherein the soil collecting device further comprises a printing device, the printing device being configured to receive geographic location identifying information and to print information representative of the geographic location indentifying information onto one or more of the individual containers, the geographic location identifying information being sufficient to substantially identify at least the approximate geographic location where the soil was excavated from the ground.

5. The apparatus of claim 2, wherein the individual containers comprise sampling bags, the soil containing system further comprising a bag opening device for opening a top portion of one sampling bag at a time.

6. The apparatus of claim 1, wherein the soil collecting device further comprises:
    a soil diverting device having an opening at a top surface, a soil collection channel, a soil diverting channel, and a diverter,
    wherein the soil collection channel is configured to direct excavated soil to a soil collection area, the soil diverting channel is configured to direct excavated soil back to the ground, and the diverter is configured to move between a first position and a second position, and
    wherein when the diverter is in the first position, excavated soil entering the soil diverting device moves from the opening at the top surface of the soil diverting device into the soil collection channel, and when the diverter is in the second position, excavated soil entering the soil diverting device moves from the opening at the top surface of the soil diverting device into the soil diverting channel.

7. The apparatus of claim 6, further comprising a soil weighing mechanism, the soil weighing mechanism being configured to weigh an individual container of collected soil, wherein when the individual container reaches a predetermined weight, the diverter moves from the first position to the second position.

8. The apparatus of claim 1, wherein the soil collecting device further comprises:
    an opening at a top surface; and
    a cover surrounding at least a part of the opening, the cover comprising a plurality of soil-receiving openings sized to prevent rocks or clots of a certain size from passing through the cover and entering into the opening.

9. The apparatus of claim 1, further comprising a soil conveying device, wherein the soil collecting device is positioned remotely from a location where the excavated soil passes through the openings in the conveyor, and the soil conveying device is configured to collect the excavated soil that passes through the openings in the conveyor and to move the excavated soil to the location of the soil collecting device.

10. A soil collection device for use with a ground crop harvester, the soil collection device comprising:
    a mounting member for mounting the soil collection device to the harvester;
    a collection area for collecting soil that is excavated from the ground by the harvester and discarded from the harvester;
    a storage device for collecting and storing at least a portion of the discarded soil in individual containers; and
    a location marking device, the location marking device being configured to mark the individual containers of collected soil with geographic location information, the geographic location information being sufficient to substantially identify at least the approximate location where the stored soil was excavated from the ground.

11. The soil collection device of claim 10, wherein the location marking device comprises a printer that is configured to receive GPS data and to print location identifying information from the GPS data onto the individual containers.

12. The soil collection device of claim 10, further comprising:
    an opening at a top surface of the soil collection device; and
    a gate that is moveable from a first position to a second position,
    wherein when the gate is in the first position, discarded soil can pass through the opening into the collection area, and when the gate is in the second position, discarded soil cannot pass through the opening into the collection area.

13. The soil collection device of claim 12, wherein when the gate is in the second position, discarded soil passes through a soil discarding channel, the soil discarding channel being configured to direct discarded soil back to the ground.

14. The soil collection device of claim 10, wherein the discarded soil comprises soil that passes through openings on a surface of a conveyor member on the ground crop harvester and into the collection area of the soil collection device.

15. The soil collection device of claim 10, further comprising a soil conveying device, the soil conveying device being positioned remotely from the soil collection area, the soil conveying device being configured to collect the discarded soil that passes through the openings in the conveyor member and to move the excavated soil to the location of the soil collecting device.

16. A method of collecting soil samples while harvesting a crop from the ground, the method comprising:
removing a layer of soil and crop from the ground;
disposing the layer of soil and crop on a conveyor member, the conveyor having a transporting surface with a plurality of openings sized to allow the soil to pass through the transporting surface;
moving the transporting surface of the conveyor member to convey the crop to a holding area;
discarding at least a portion of the soil from the conveyor member during the act of conveying the crop to the holding area by allowing the soil to pass through the porous transporting surface of the conveyor;
collecting at least a portion of the discarded soil in a soil collection device, the soil collection device comprising a plurality of individual containers; and
storing the collected soil in one or more of the individual containers.

17. The method of claim 16, further comprising:
printing location identifying information on one or more of the individual containers, the location identifying information being sufficient to substantially identify at least the approximate location where the stored soil was removed from the ground.

18. The method of claim 16, further comprising:
after determining that a sufficient amount of soil has been stored in one individual container, closing an opening through which the discarded soil must pass to be received in the soil collection device.

19. The method of claim 16, wherein the individual containers comprise sampling bags and the act of collecting the collected soil in one or more of the individual containers comprises:
opening at least one sampling bag; and
receiving collected soil in the sampling bag.

* * * * *